United States Patent [19]
Miyakawa et al.

[11] Patent Number: 5,699,872
[45] Date of Patent: Dec. 23, 1997

[54] STRUCTURE AND METHOD FOR EASY ACCESS TO AND MAINTENANCE OF ACCESSORIES IN A VEHICLE WITHOUT REMOVING A POWER UNIT

[75] Inventors: Futoshi Miyakawa; Masahiro Kawamata; Yoshiaki Hamada; Kosuke Asao; Tsuneo Kajikawa, all of Saitama, Japan

[73] Assignee: Honda Giken Kogyo Kabushiki Kaisha, Tokyo, Japan

[21] Appl. No.: 478,806

[22] Filed: Jun. 7, 1995

[30]  Foreign Application Priority Data

Jul. 12, 1994 [JP] Japan ................... 6-160316

[51] Int. Cl.⁶ ................................. B60K 13/04
[52] U.S. Cl. ............ 180/291; 180/312; 180/294; 180/233
[58] Field of Search ................. 180/291, 312, 180/294, 292, 233, 311, 210; 280/781

[56] References Cited

U.S. PATENT DOCUMENTS

| | | | |
|---|---|---|---|
| 4,372,415 | 2/1983 | Watanabe et al. | 180/297 X |
| 4,535,866 | 8/1985 | Shiga | 180/291 X |
| 4,666,015 | 5/1987 | Matsuda et al. | 180/233 |
| 4,757,872 | 7/1988 | Inomata | 180/291 |
| 4,836,324 | 6/1989 | Morita et al. | 180/291 |
| 5,467,839 | 11/1995 | Yoshio | 180/233 |

FOREIGN PATENT DOCUMENTS 4-18593  3/1992  Japan.

Primary Examiner—Christopher P. Ellis

[57] ABSTRACT

A crank shaft of a power unit is disposed in the longitudinal direction of a vehicular body. Accessories provided at either end portion of the crank shaft are covered with a front cover and rear covers which are removable from a casing. Front and rear drive shafts are disposed to be lower than the axial line of the crank shaft. A fan unit and an air cleaner are disposed to be higher than the axial line, so that front and rear operating spaces for inserting an impact wrench are formed in front of and in back of the front cover and the rear covers. The maintenance is performed through the operational spaces.

27 Claims, 17 Drawing Sheets

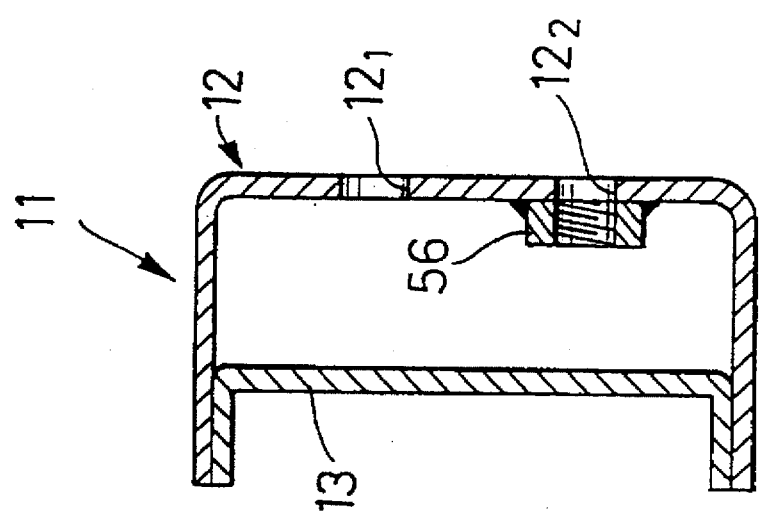
FIG. 8
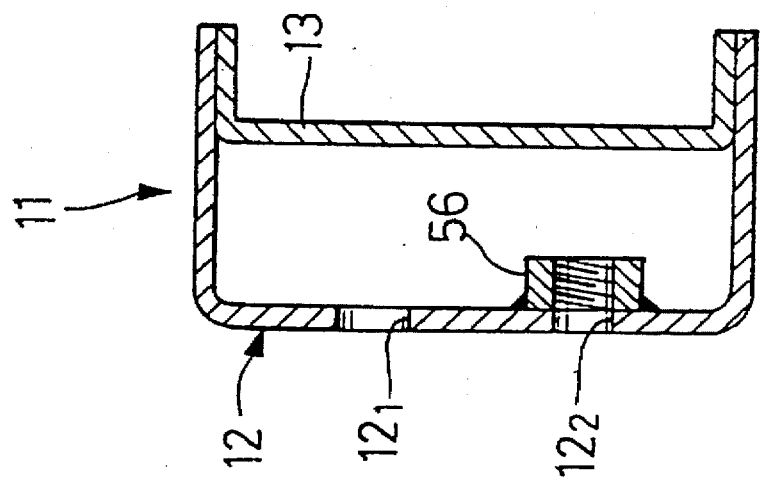

5,699,872

STRUCTURE AND METHOD FOR EASY ACCESS TO AND MAINTENANCE OF ACCESSORIES IN A VEHICLE WITHOUT REMOVING A POWER UNIT

BACKGROUND OF THE INVENTION

1. Field of the invention

The present invention relates to a vehicle, and particularly to an improved all terrain vehicle including a power-unit having a crank shaft disposed in the longitudinal direction of a vehicular body mounted between a pair of front wheels and a pair of rear wheels, respectively provided on front and rear portions of the vehicular body. A steering handle and a saddle type seat are provided over the power-unit.

2. Description of Background Art

The all terrain vehicle of this type is well-known, for example, as disclosed in Japanese Patent Publication No. HEI 4-18593.

In the case where a crank shaft of a power unit is disposed in the longitudinal direction of a vehicular body as exemplified in the above-described all terrain vehicle, a main shaft, a counter shaft and an output shaft of a transmission for transmitting a drive force to the front and rear wheels is disposed in parallel to the crank shaft. This construction is advantageous in simplifying the structure and improving the transmitting efficiency because all of the transmission gears can be made of spur gears. Further, front and rear drive shafts connected to the front and rear wheels can be directly connected to the output shaft.

Incidentally, in the power unit of the background art, accessories such as a power generator are removably mounted on the end portion of the crank shaft, and they are covered with covers removable from a casing of the power unit.

However, in the above-described background art all terrain vehicle, the covers and accessories cannot be mounted/dismounted by insertion of a tool such as an impact wrench because no operating space is provided in front of or in back of the covers for covering the accessories. As a consequence, the whole power unit must be removed from the vehicular body for maintenance of the accessories, thus causing a problem in taking a lot of time for removal of the power unit.

SUMMARY OF THE INVENTION

In view of the foregoing, an object of the present invention is to provide an all terrain vehicle allowing access to and maintenance of accessories provided on either end portion of a crank shaft while leaving a power unit mounted on a vehicular body.

To achieve the above and other objects, according to the invention, there is provided an all terrain vehicle in which a power unit having a crank shaft disposed in the longitudinal direction of a vehicular body is mounted between a pair of front wheels and a pair of rear wheels, respectively provided on front and rear portions of the vehicular body. Art accessory removably provided at an end portion of the crank shaft is covered with a removable cover, and an operational space is formed in front of or in back of the covers. The accessory may be, for example, a power generator, a recoil starter, or a clutch.

Advantageously, the operational space is large enough to receive a tool while the power unit is still in position in the vehicle.

The vehicle may further include an output shaft parallel to the crank shaft, a front drive shaft connecting the output shaft to the pair of front wheels, and a rear drive shaft connecting the output shaft to the pair of rear wheels, wherein an axial line of the crank shaft is higher than an axial line of the front drive shaft and of the rear drive shaft.

The vehicle may further include a fan unit and an air cleaner, wherein a lower end of the fan unit and a lower end of said air cleaner are higher than an axial line of the crank shaft.

The vehicle may also include a right and a left side member of the vehicular body, and a right and left mounting bracket fixed on a corresponding one of the right and left side members, wherein the accessory further includes a right and left flange horizontally extending from an upper surface of the accessory, the accessory being removably provided by, for each flange, a rubber bushing fitted in the flange, a collar passing through the center of the rubber bushing, a bolt passing through the collar, and a nut fixing the bolt on the mounting bracket.

Alternatively, clip holes may be provided on an upper surface of the side members and resin clips pass through mounting brackets projecting from the accessory to elastically engage with said clip holes.

The removable cover advantageously includes a front cover removable within the operational space in front of the removable cover and/or a rear cover removable within the operational space in the back of the removable cover. When the accessory to be maintained is a power generator or a recoil starter, the accessory is removable or maintainable after the rear cover has been removed. When the accessory is a starting clutch or a gear-shifting clutch, the accessory is removable or maintainable after said front cover has been removed.

The objects of the present invention are also provided by a method of maintaining accessories in a vehicle while a power unit remains in position in the vehicle. An accessory is removably providing at an end portion of a crank shaft in the vehicle and covered with a removable cover. An operational space is formed in front of and/or in back of the removable cover. A tool is then inserted into the operational space for engaging with the accessory in the operational space.

The method advantageously includes providing an output shaft parallel to the crank shaft and mounting the crank shaft such that an axial line of the crank shaft is higher than an axial line of a front drive shaft connecting the output shaft to the front wheels and an axial line of a rear drive shaft connecting the output shaft to the rear wheels.

The method further advantageously includes mounting a fan unit and an air cleaner such that a lower end of the fan unit and a lower end of the air cleaner are higher than an axial line of the crank shaft.

The method may include bolting right and left flanges extending from the accessory to mounting brackets on corresponding right and left side members of a vehicular body of the vehicle. Alternatively, the method may include providing clip holes on upper surfaces of right and left side members of a vehicular body of the vehicle, and passing resin clips through mounting brackets projecting from the accessory and through the clip holes.

The maintenance of the accessory may be performed by inserting the tool in the space in front of the removable cover and removing a front portion of the removable cover to access the accessory or inserting the tool in the space behind the removable cover and removing a rear portion of the removable cover. Alternatively, maintenance may be performed by removing the accessory to be maintained using the tool, performing maintenance on said removed accessory and replacing the accessory in the vehicle, while the power unit remains mounted in the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is an enlarged sectional view taken along line 8—8 of FIG. 3;

DETAILED DESCRIPTION OF THE PREFERRED EMBODIMENTS

Hereinafter, an exemplary embodiment of the present invention will be described with reference to the drawings.

Figure 1:
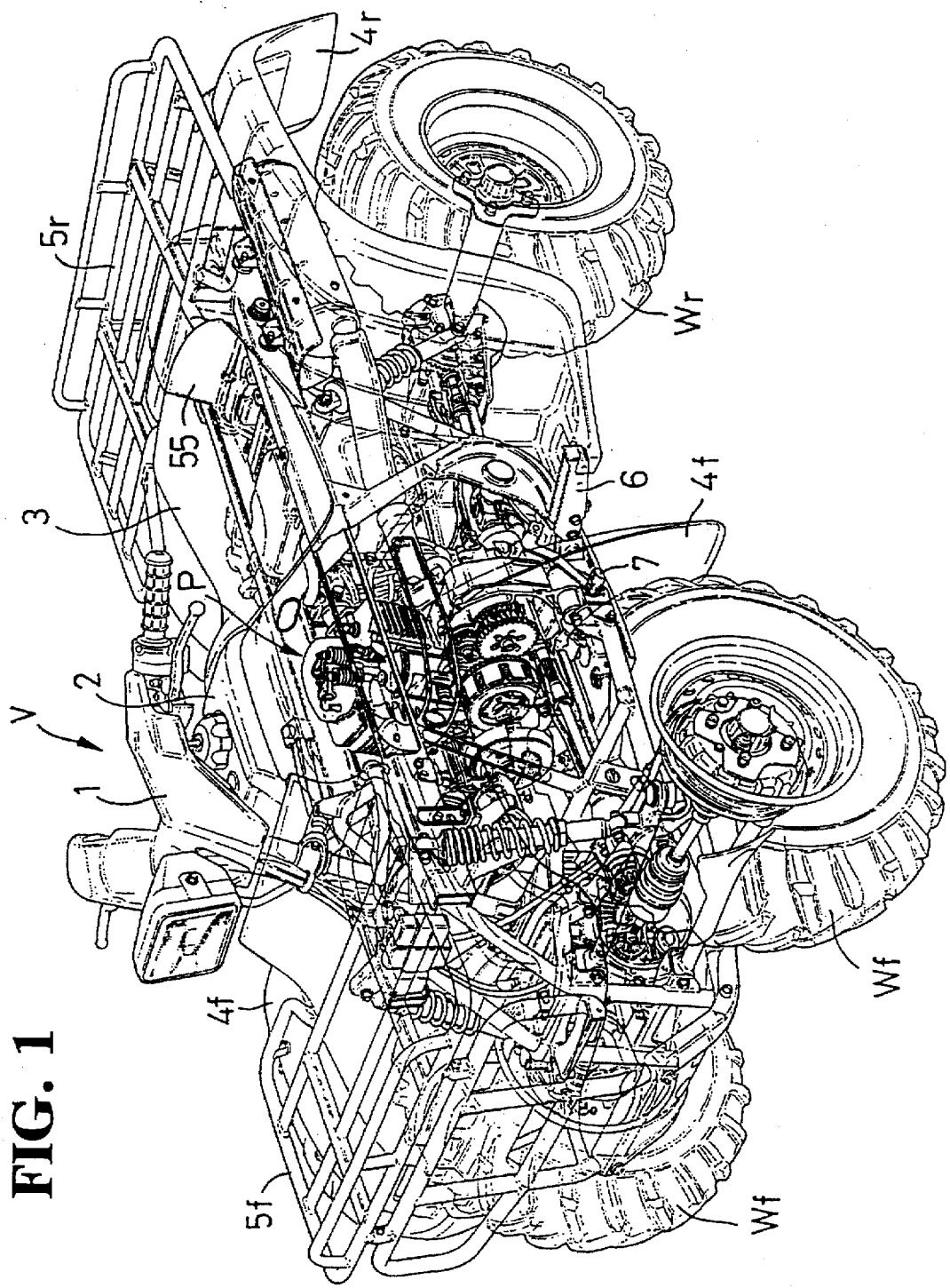
FIG. 1 is a perspective view showing the whole construction of an all terrain vehicle.
Figure 2:
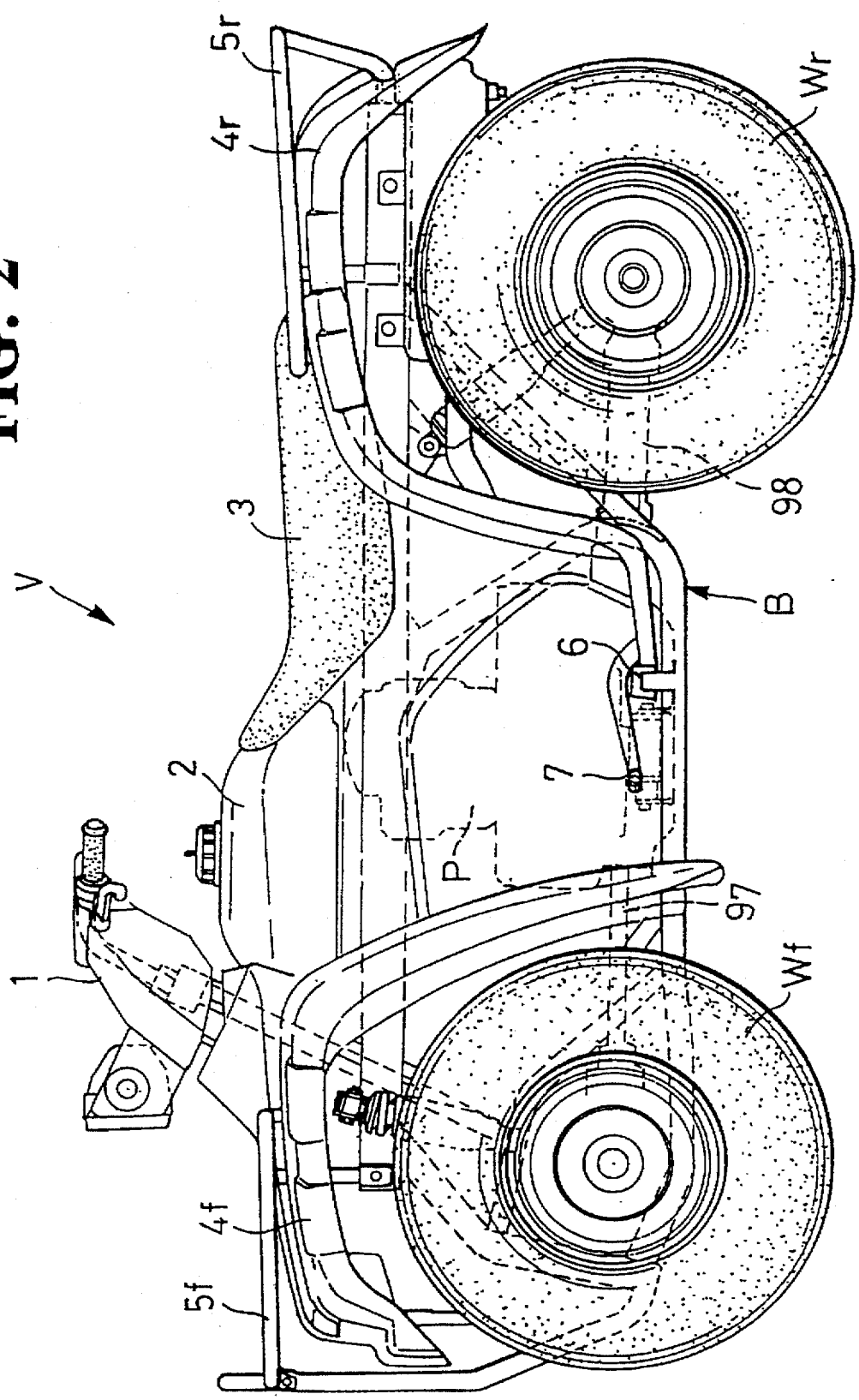
FIG. 2 is a side view showing the whole construction of the all terrain vehicle.

As shown in FIGS. 1 and 2, an all terrain vehicle V has a pair of right and left front wheels Wf, Wf and a pair of right and left rear wheels Wr, Wr which are respectively suspended from front and rear portions of a vehicle body frame B. A balloon type low pressure tire is mounted around each of the front wheels Wf, Wf and the rear wheels Wr, Wr. On the upper portion of the vehicular body frame B, a steering handle 1, a fuel tank 2 and a saddle type seat 3 are disposed in this order from the front. Under the steering handle 1, the fuel tank 2 and the seat 3, a power unit P for driving the front wheels Wf, Wf and the rear wheels Wr, Wr is mounted on the central portion of the vehicular body frame B.

Fenders 4f, 4f, and 4r, 4r are mounted on the vehicular body frame B for covering the upper portions of the front and the rear wheels Wf, Wf and Wr, Wr throughout the approximately semi-peripheral range. Carriers 5f, 5r are respectively provided on the upper surfaces of the fenders 4f, 4f and 4r, 4r.

A pair of right and left steps 6, 6 projecting outwardly from right and left sides of the power unit P are fixed at the center of the lower portion of the vehicular body frame B for supporting both feet of a driver who sits astride the seat 3. A change-pedal 7 is disposed in the vicinity of the left step 6, and a brake pedal 8 (see FIG. 13) is disposed in the vicinity of the right step 6.

Figure 3:
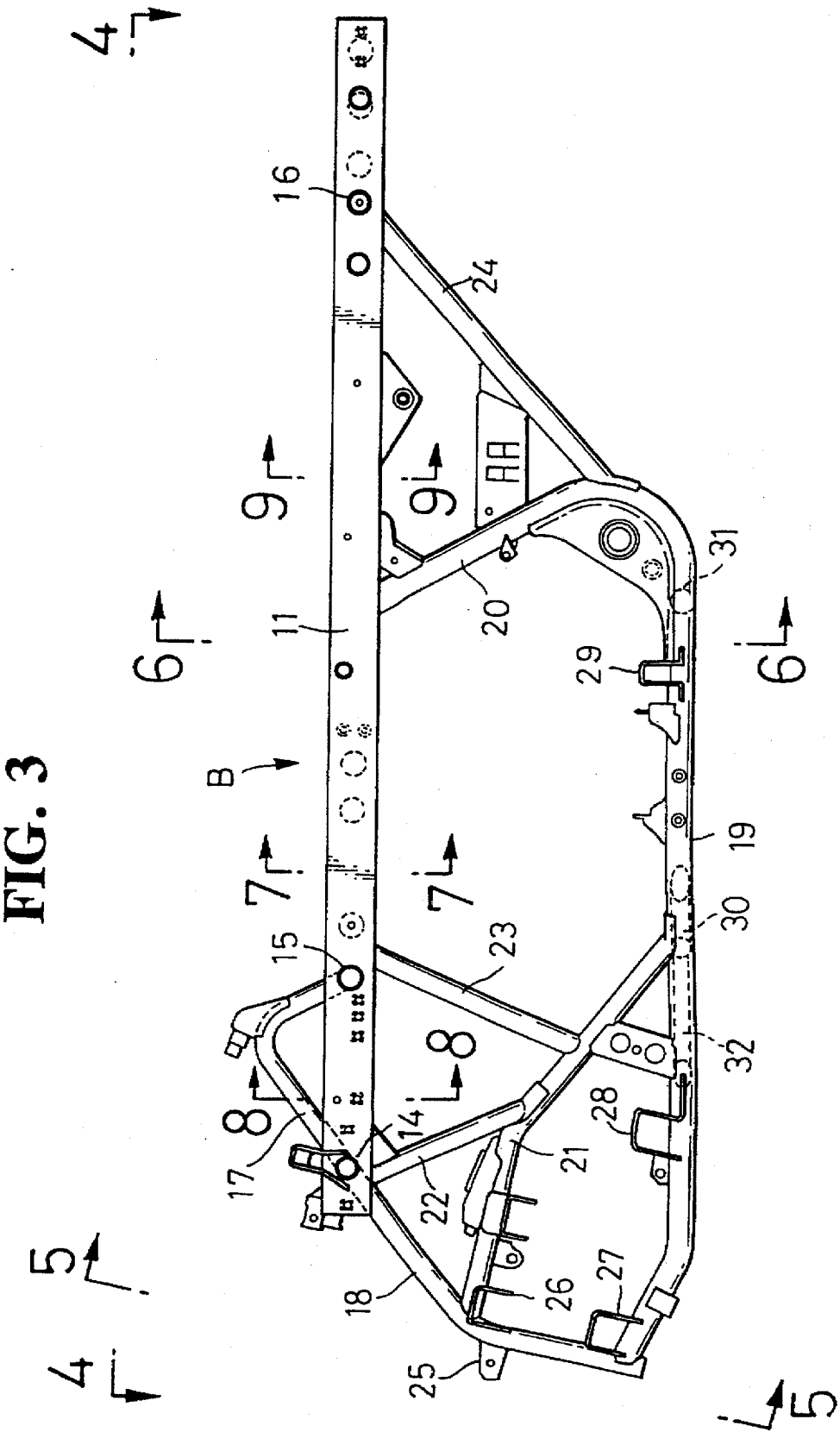
FIG. 3 is a side view showing the whole construction of a vehicular body frame.
Figure 4:
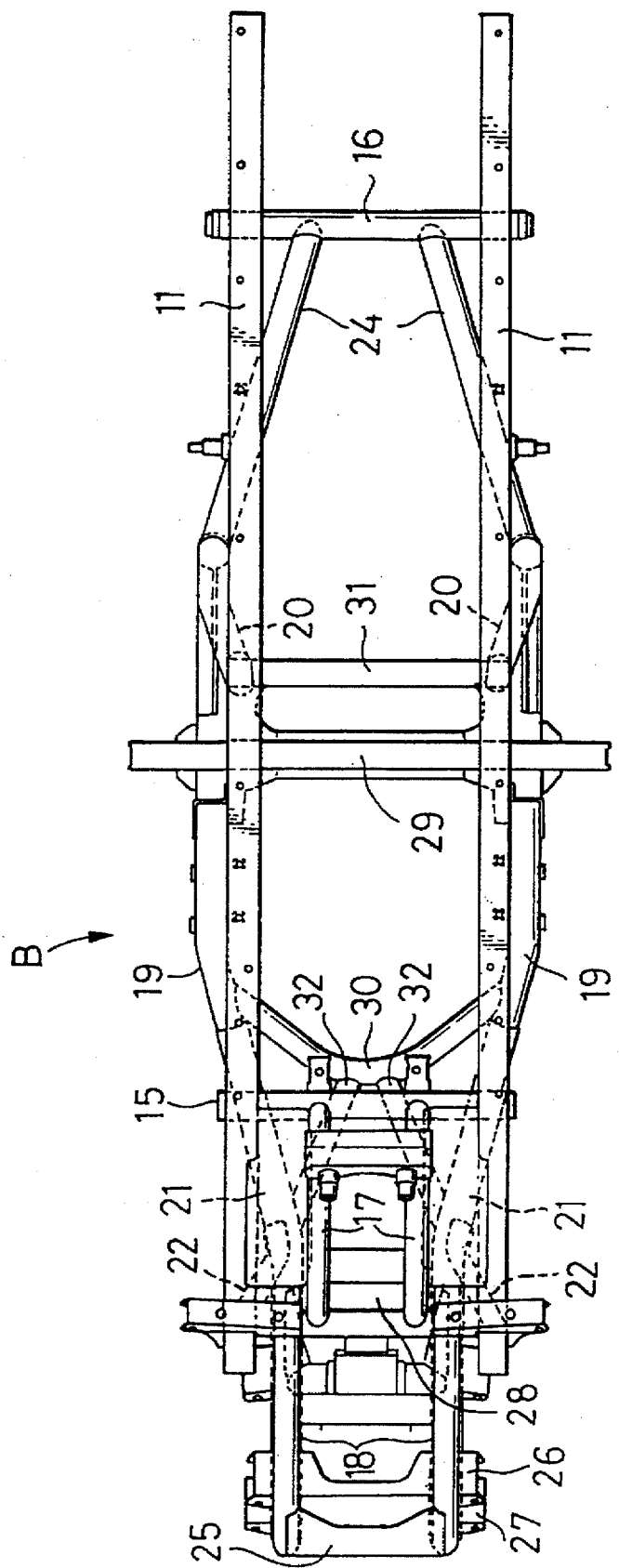
FIG. 4 is a view seen along line 4—4 of FIG. 3.
Figure 5:
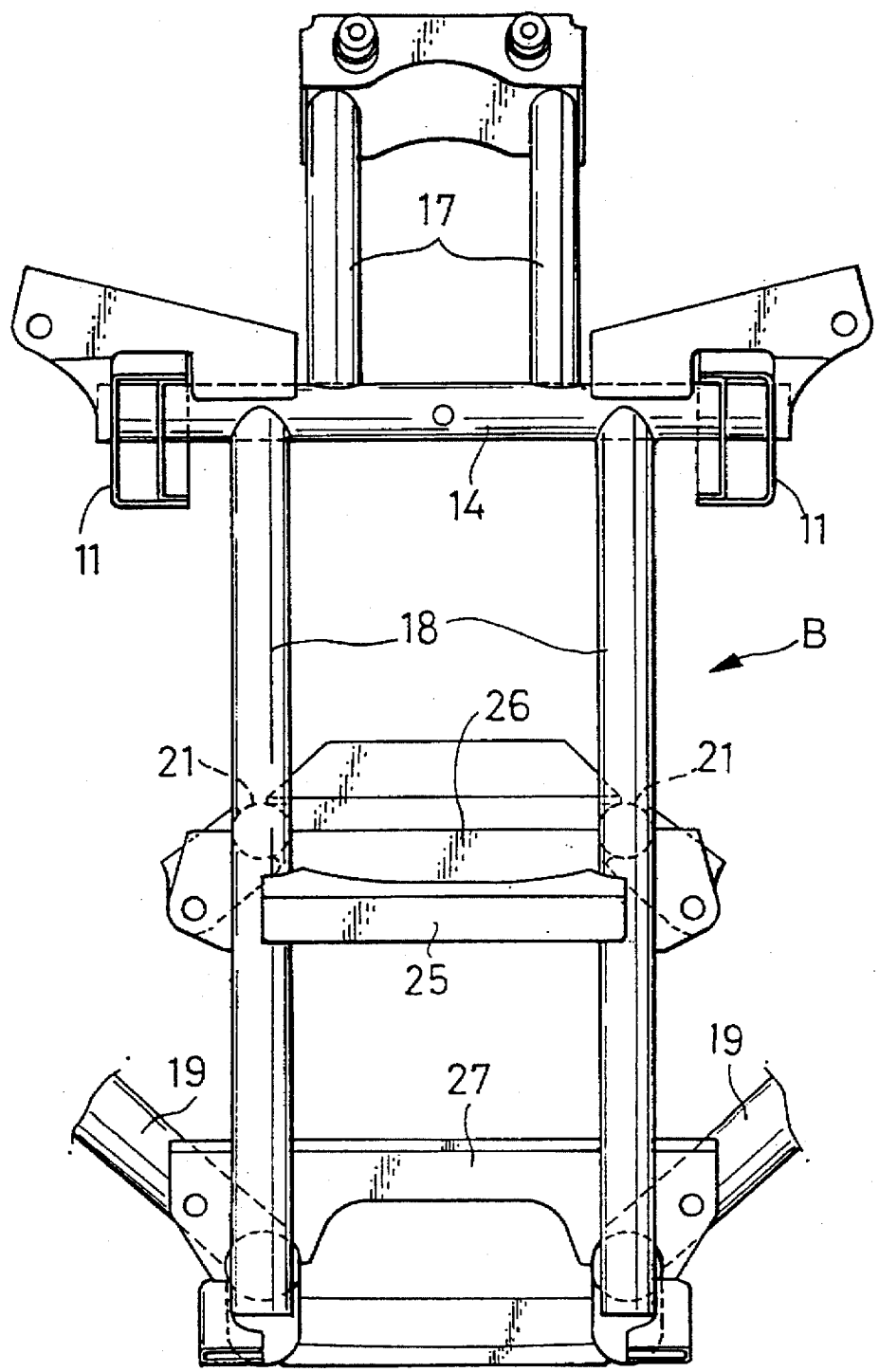
FIG. 5 is an enlarged view seen along line 5—5 of FIG. 3.
Figure 6:
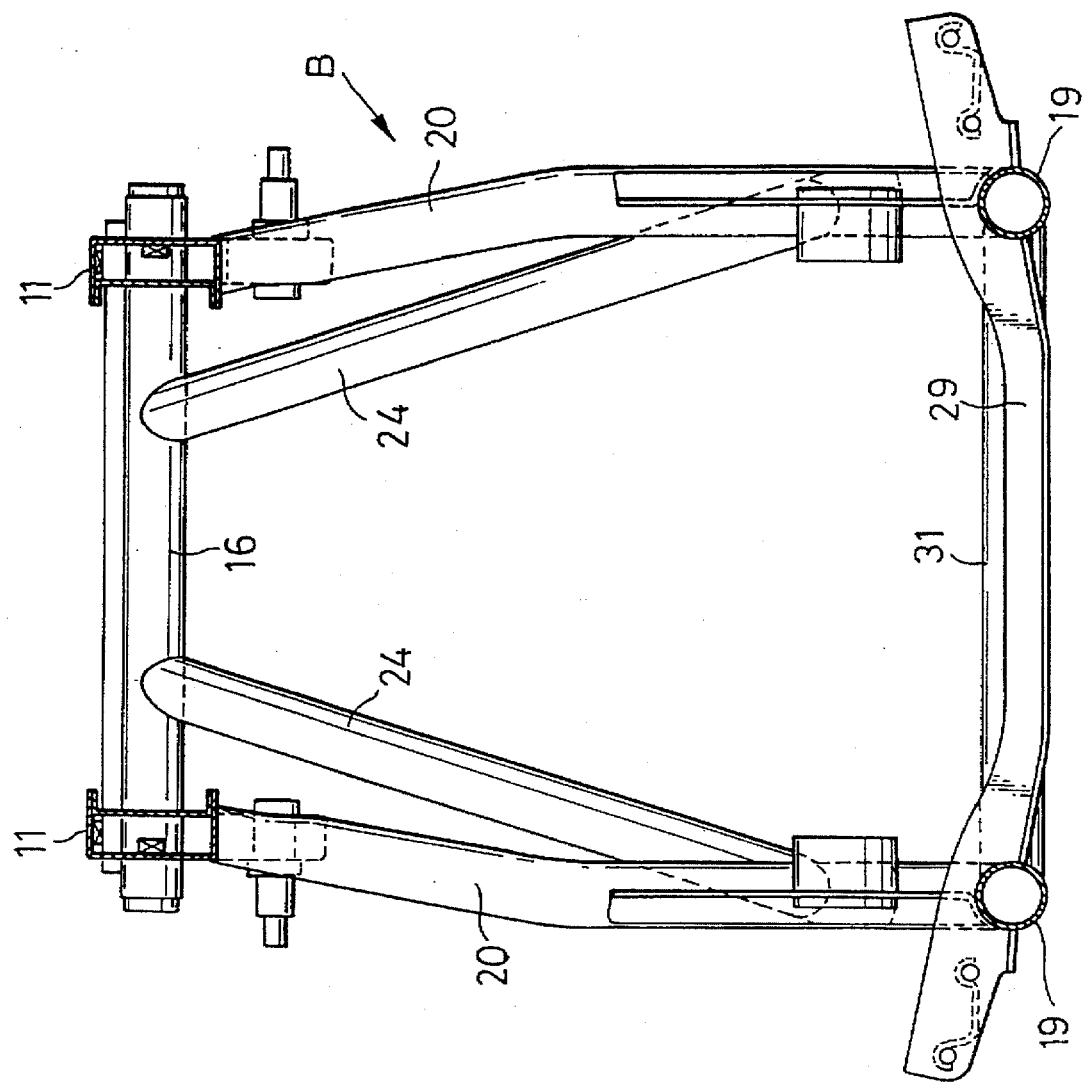
FIG. 6 is an enlarged sectional view taken along line 6—6 of FIG. 3.
Figure 7:
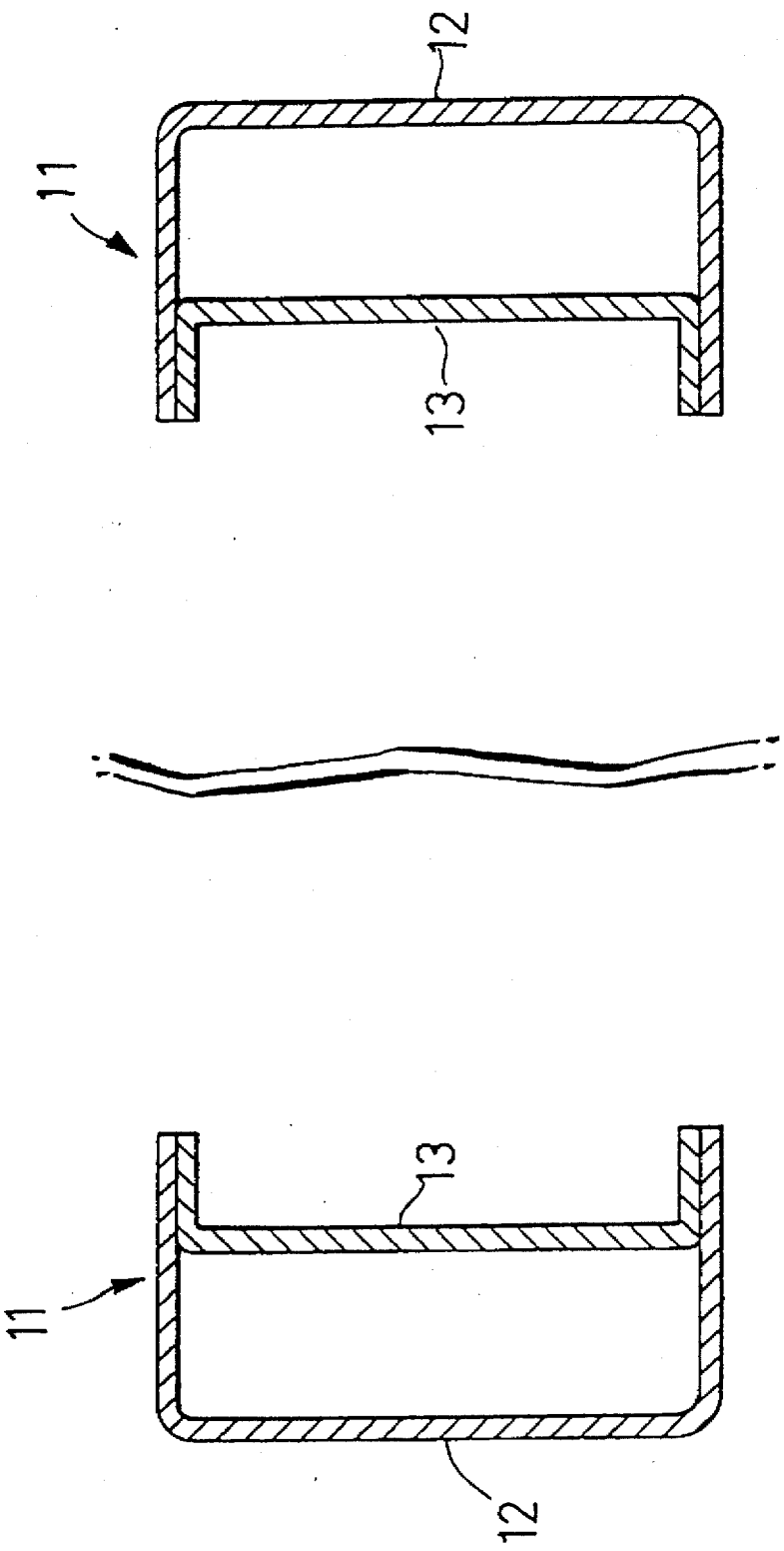
FIG. 7 is an enlarged sectional view taken along line 7—7 of FIG. 3.
Figure 9:
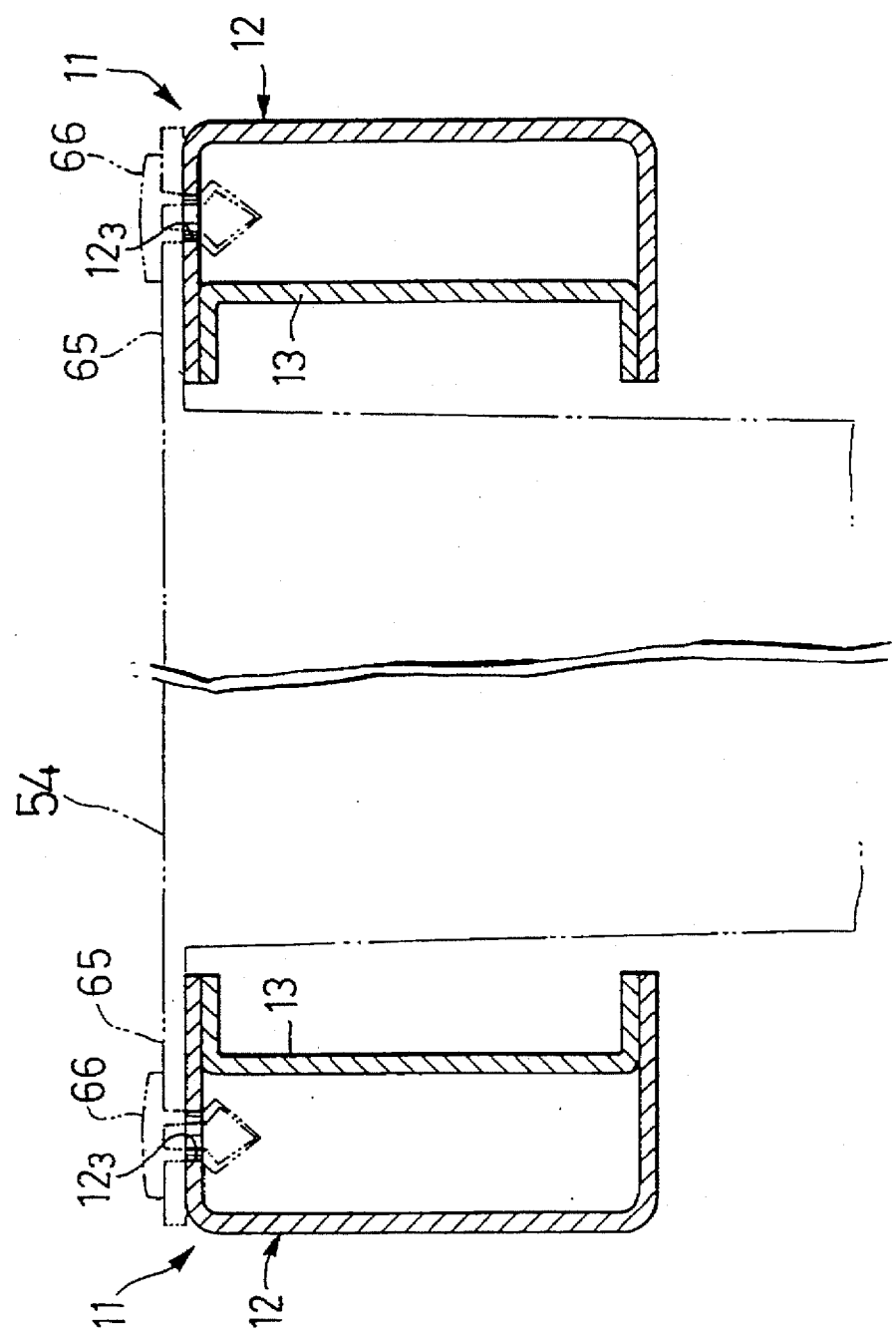
FIG. 9 is an enlarged sectional view taken along line 9—9 of FIG. 3.

The structure of the vehicular body frame B will be described below with reference to FIGS. 3 to 9. FIG. 3 is a side view showing the whole construction of the vehicular body frame. FIG. 4 is a view seen along line 4—4 of FIG. 3. FIG. 5 is an enlarged view seen along line 5—5 of FIG. 3. FIG. 6 is an enlarged sectional view taken along line 6—6 of FIG. 3. FIG. 7 is an enlarged sectional view taken along line 7—7 of FIG. 3. FIG. 8 is an enlarged sectional view taken along line 8—8 of FIG. 3. FIG. 9 is an enlarged sectional view taken along line 9—9 of FIG. 3.

The vehicular body frame B includes a pair of right and left side members 11, 11 extending parallel to one another along the longitudinal direction of the vehicular body. Each side member 11 is formed by a method of fitting an inner side channel member 13 opened inwardly of the vehicular body into an opening portion of an outer side channel member 12 opened inwardly of the vehicular body and welding them to each other. Each side member 11 has a hollow box like cross-section (see FIGS. 7 to 9). The right and left side members 11, 11 are connected to each other by means of front, central and rear cross-members 14, 15, 16 each of which is formed of a pipe member having a circular cross-section.

The front cross-member 14 and the central cross-member 15 are connected to each other by means of a pair of right and left upper pipes 17, 17, each of which is bent upwardly, and a pair of right and left front pipes 18, 18, each of which extend forwardly and downwardly from the front cross-member 14. A pair of right and left lower pipes 19, 19, each of which extends in the longitudinal direction of the vehicular body and protrude outwardly from the vehicular body on the rear side of the vehicular body, are connected to the lower ends of the right and left front pipes 18, 18. The rear ends of these lower pipes 19, 19 are curved upwardly and are integrated with rear pipes 20, 20. The rear pipes 20, 20 are connected to the lower surfaces of the right and left side members 11, 11. The intermediate portions of the right and left front pipes 18, 18 are connected to the intermediate portions of the right end left lower pipes 19, 19 by means of a pair of right and left mid pipes 21, 21.

The upper ends of the right and left front pipes 18, 18 are connected to the intermediate portions of the right and left mid pipes 21, 21 by means of a pair of right and left reinforcing pipes 22, 22. The intermediate portions of the right and left mid pipes 21, 21 are connected to the lower surfaces of the right and left side members 11, 11 by means of a pair of right and left reinforcing pipes 23, 23. The lower ends of the right end left rear pipes 20, 20 are connected to the rear cross-member 16 by means of a pair of right and left reinforcing pipes 24, 24. The right and left front pipes 18, 18, the right and left lower pipes 19, 19, and the right and left mid pipes 21, 21 are connected to each other by pressed steel plate cross-members 25, 26, 27, 28 and 29.

As for the right and left lower pipes 19, 19, the intermediate portions thereof are connected to each other by a cross-member 30 made of an arcuately curved pipe, and the rear portions thereof are connected to each other by a cross-member 31 made of a straight pipe. The cross-member 30 is connected to the right and left lower pipes 19, 19 by means of a pair of right and left reinforcing pipes 32, 32.

Figure 10:
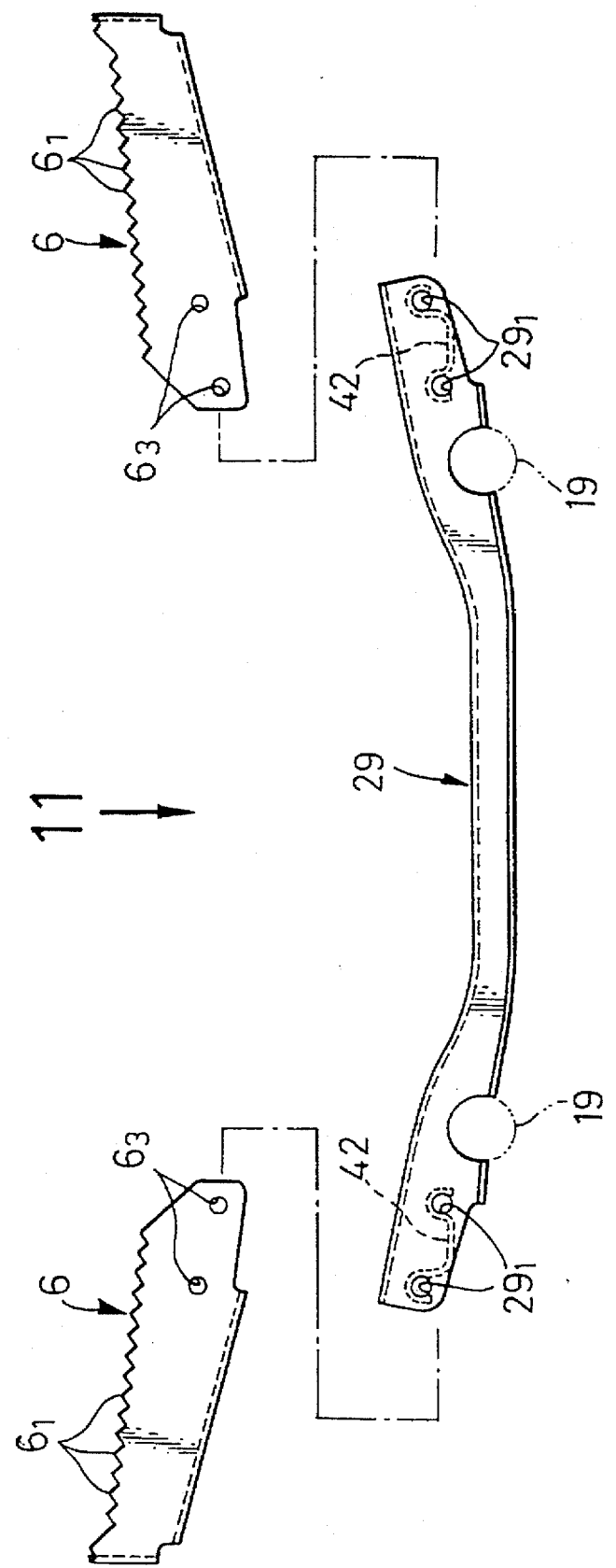
FIG. 10 is a front view showing a step mounting portion.
Figure 11:
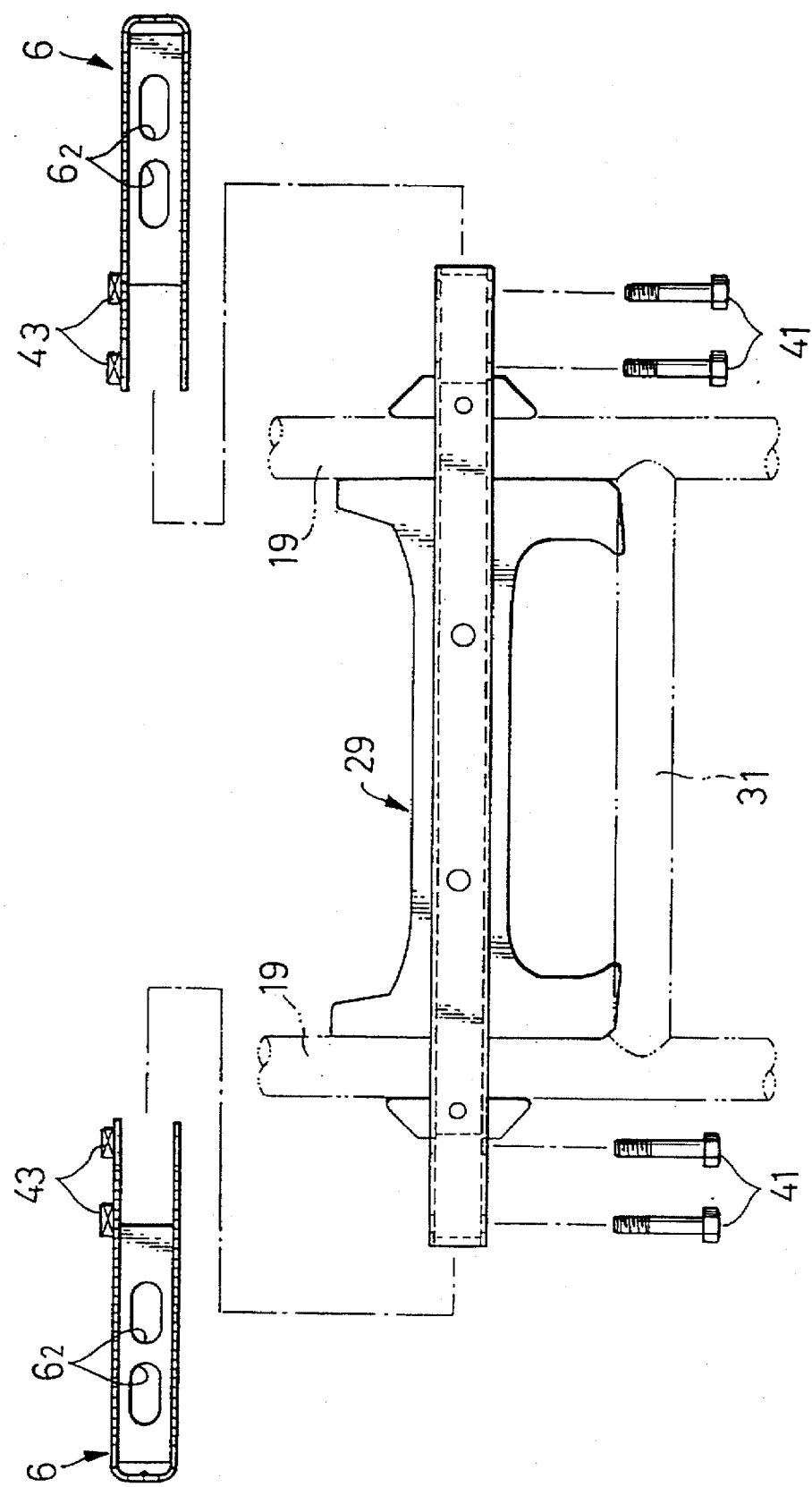
FIG. 11 is a view seen from the arrow 11 of FIG. 10.
Figure 12:
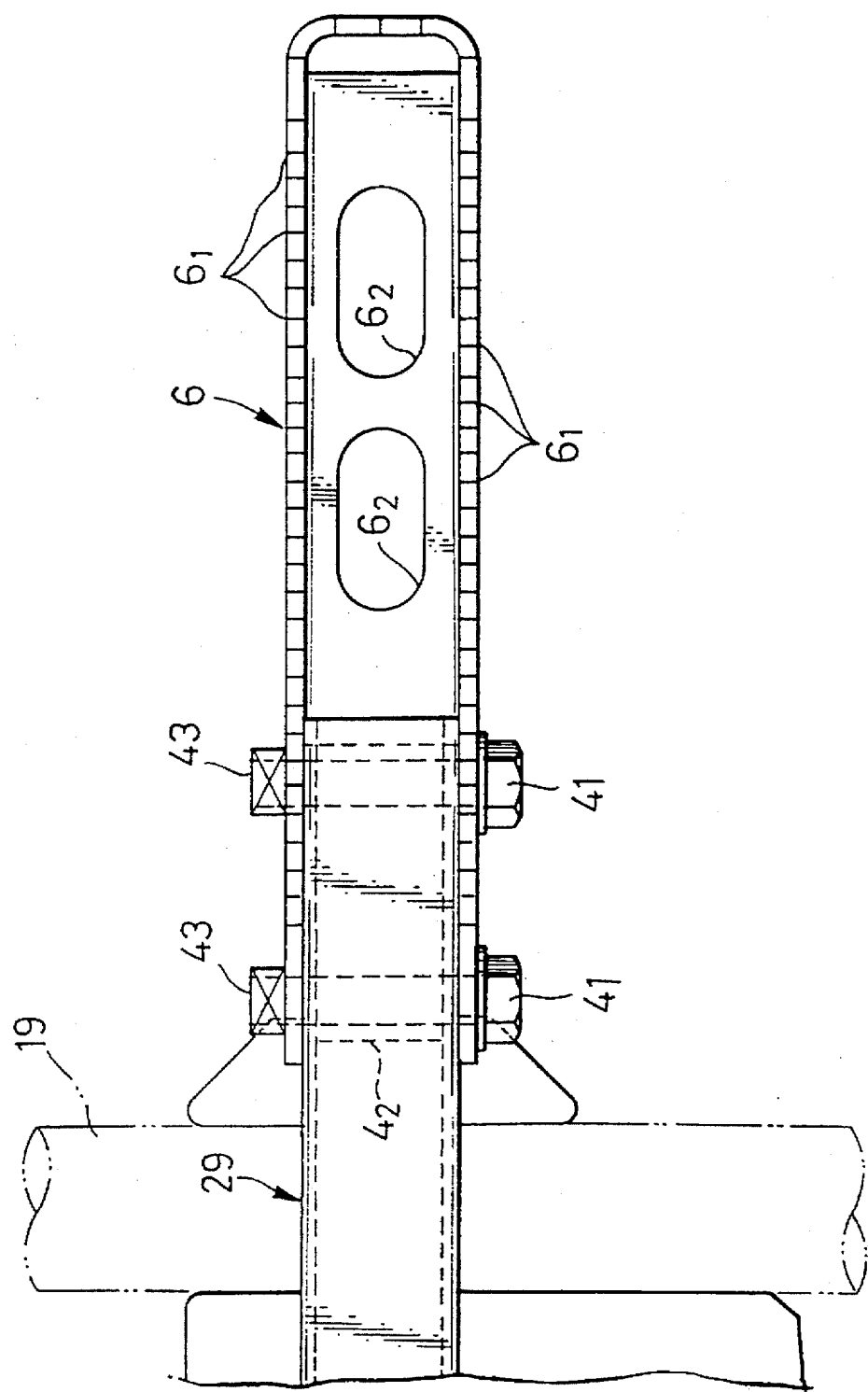
FIG. 12 is an enlarged plan view showing the step mounting portion.

The structure of the steps 6, 6 will be described in detail with reference to FIGS. 10 to 12. FIG. 10 is a front view showing a step mounting portion. FIG. 11 is a view seen from the direction of the arrow 11 of FIG. 10, FIG. 12 is an enlarged plan view showing the step mounting portion.

The right and left ends of the pressed steel plate cross-member 29 connecting the right and left lower pipes 19, 19 to each other extend sidewardly from the vehicular body from the lower pipes 19, 19. On the front and rear positions of each extended portion of the cross-member 29, bolt holes $29_1$, $29_1$ for allowing two bolts 41, 41 to pass therethrough are formed. Reinforcing members 42, 42 for receiving the fastening load of the bolts 41, 41 are welded on the inner surface of each extending portion of the cross-member 29.

In each of the pressed steel plate steps 6, 6, the lower surface and the outer end portion are closed, and the upper surface and the inner end portion are opened. Sawtooth like shaped preventive projections $6_1$, $6_1$ . . . are formed on the upper edge portion of each of the steps 6, 6 on which the feet of a driver are placed. Two drain openings $6_2$, $6_2$ are provided on the lower surface of each step 6. Moreover, bolt holes $6_3$, $6_3$ for allowing the bolts 41, 41 to pass therethrough are formed at the front and rear positions of the inner end portion of each step 6, and weld nuts 43 are provided on the front surface of the step 9 at the positions corresponding to the bolt holes $6_3$.

The steps 6, 6 are mounted to the cross-member 29 by fitting the inner ends of the steps 6, 6 to the outer ends of the cross-member 29, inserting the right and left bolts 41, 41, 41, 41 into the bolt holes $6_3$, $6_3$, $6_3$, $6_3$ and $29_1$, $29_1$, $29_1$, $29_1$, and screwing them in the weld nuts 43, 43, 43, 43. Each step 6 can be thus easily mounted in a short period of time, and further can can be forcibly fixed using only the two bolts 41, 41.

Figure 13:
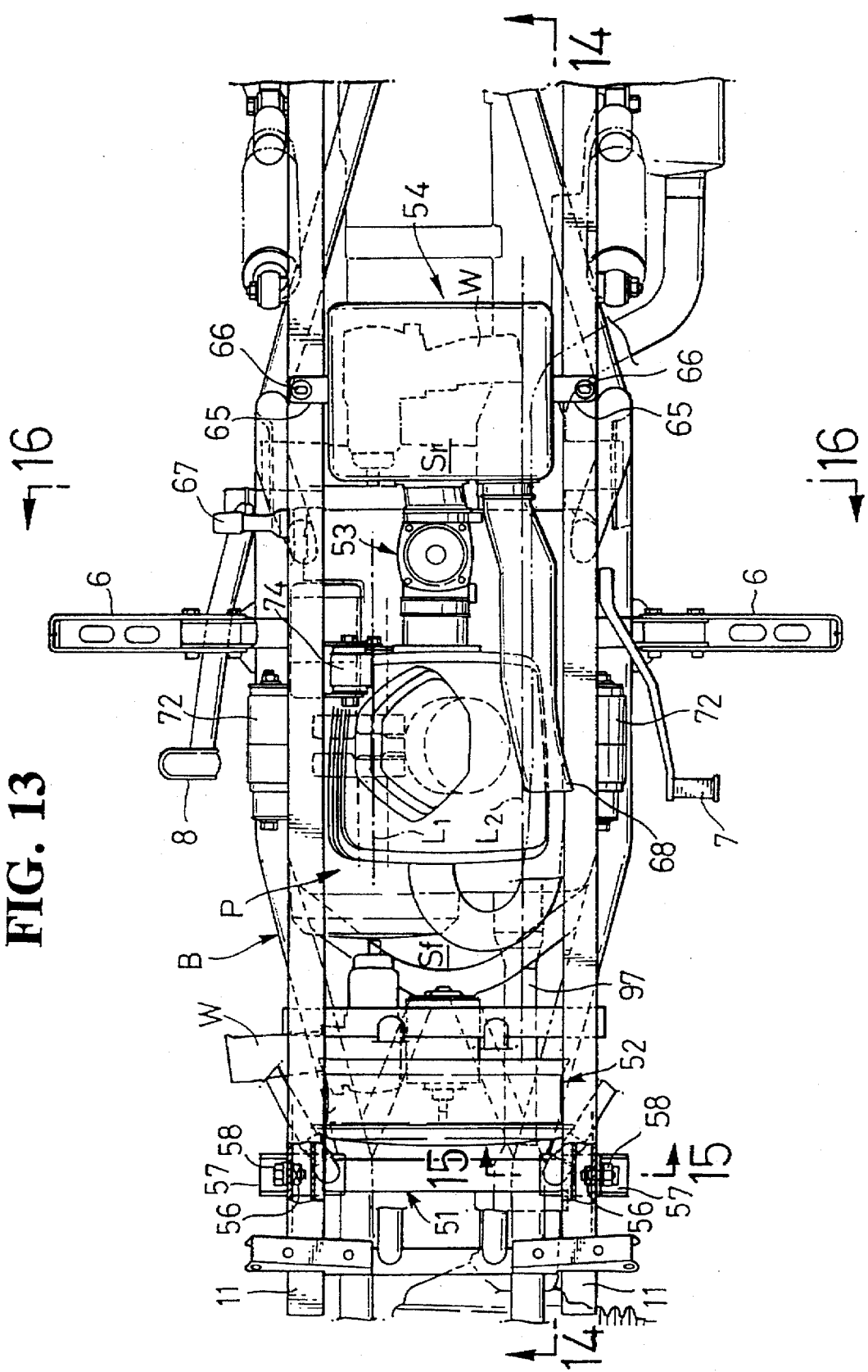
FIG. 13 is an enlarged plan view showing the central portion of the vehicular body.
Figure 14:
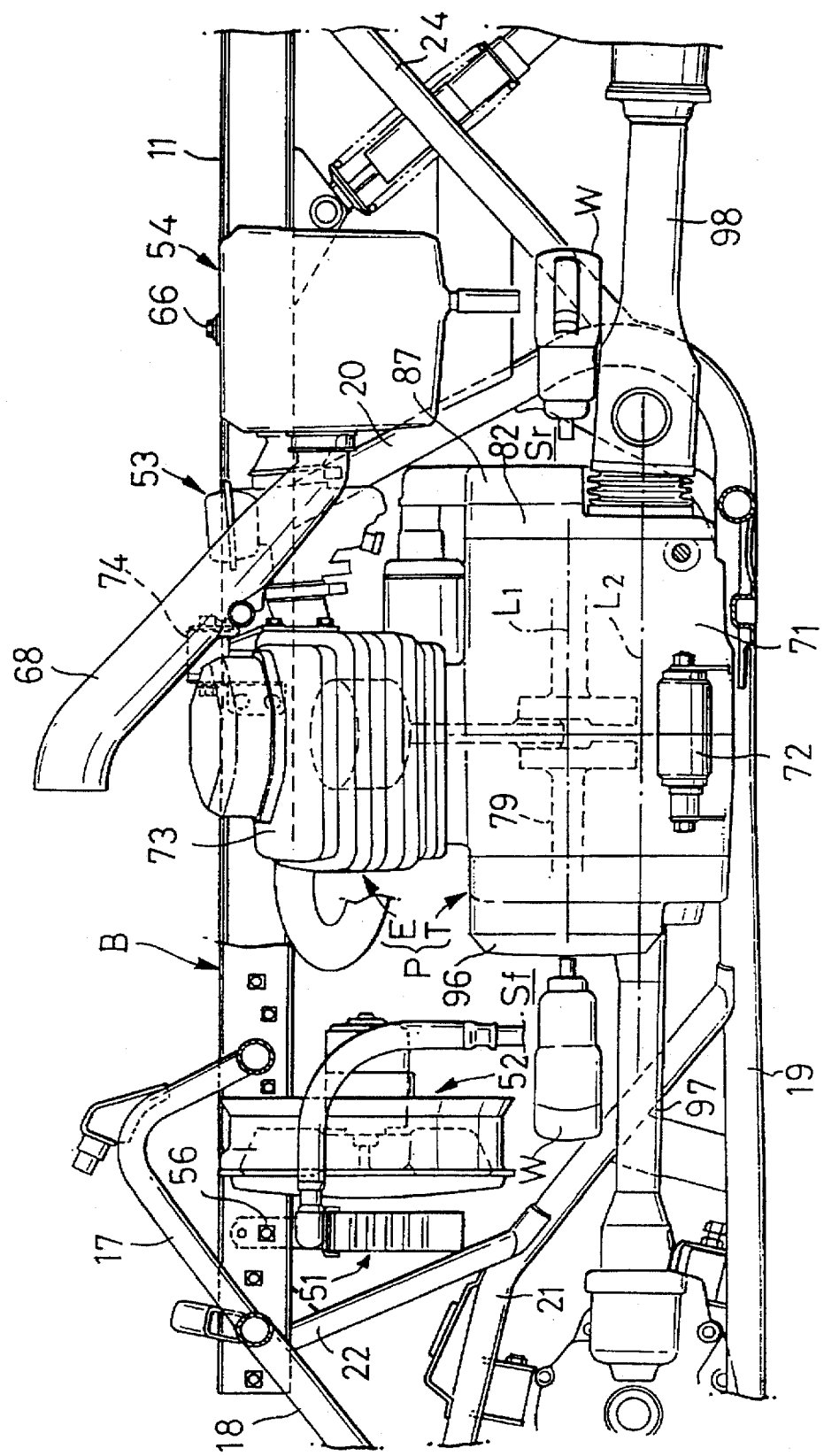
FIG. 14 is a view seen along line 14—14 of FIG. 13.
Figure 15:
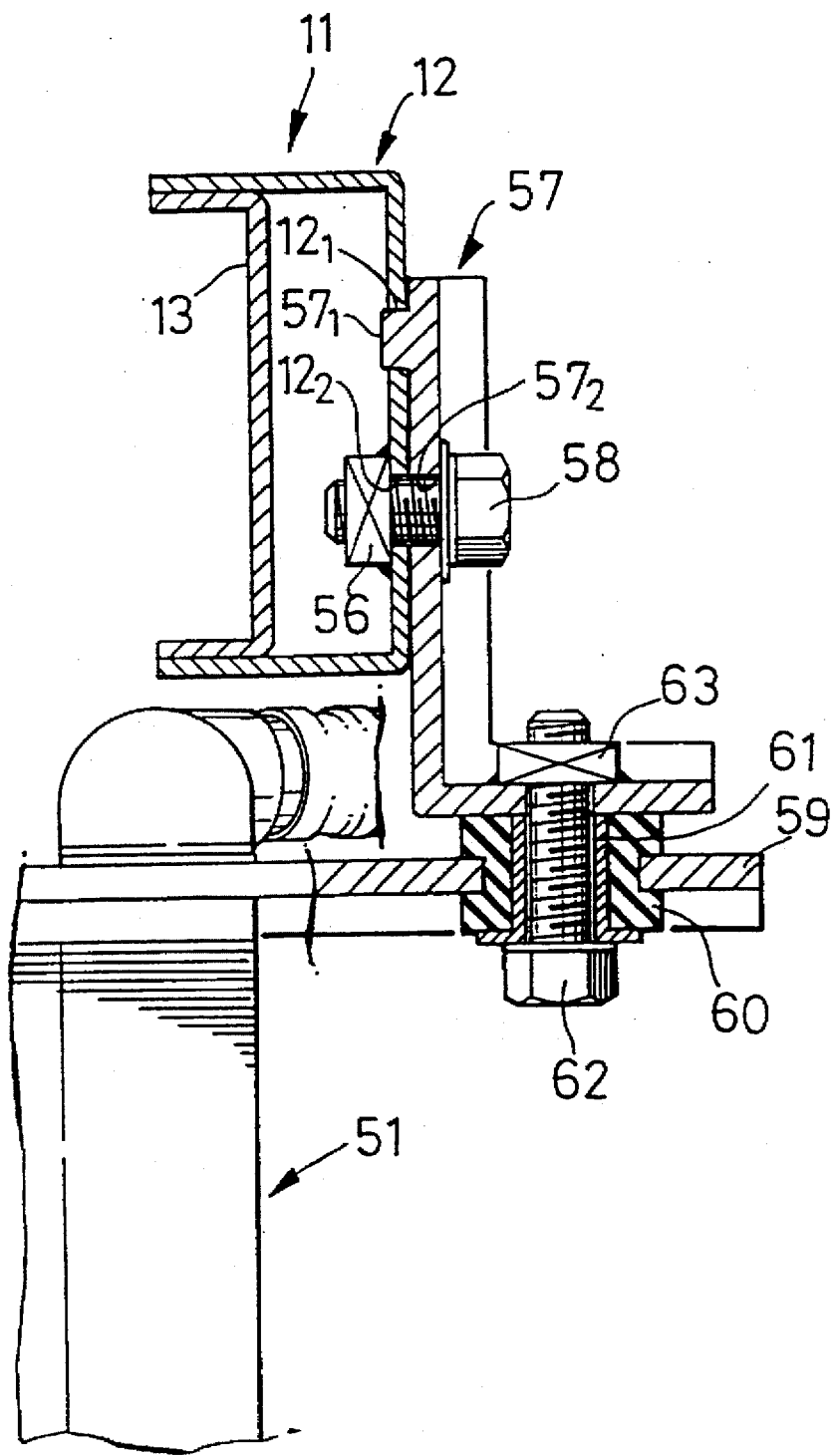
FIG. 15 is a sectional view taken along line 15—15 of FIG. 13.
Figure 16:
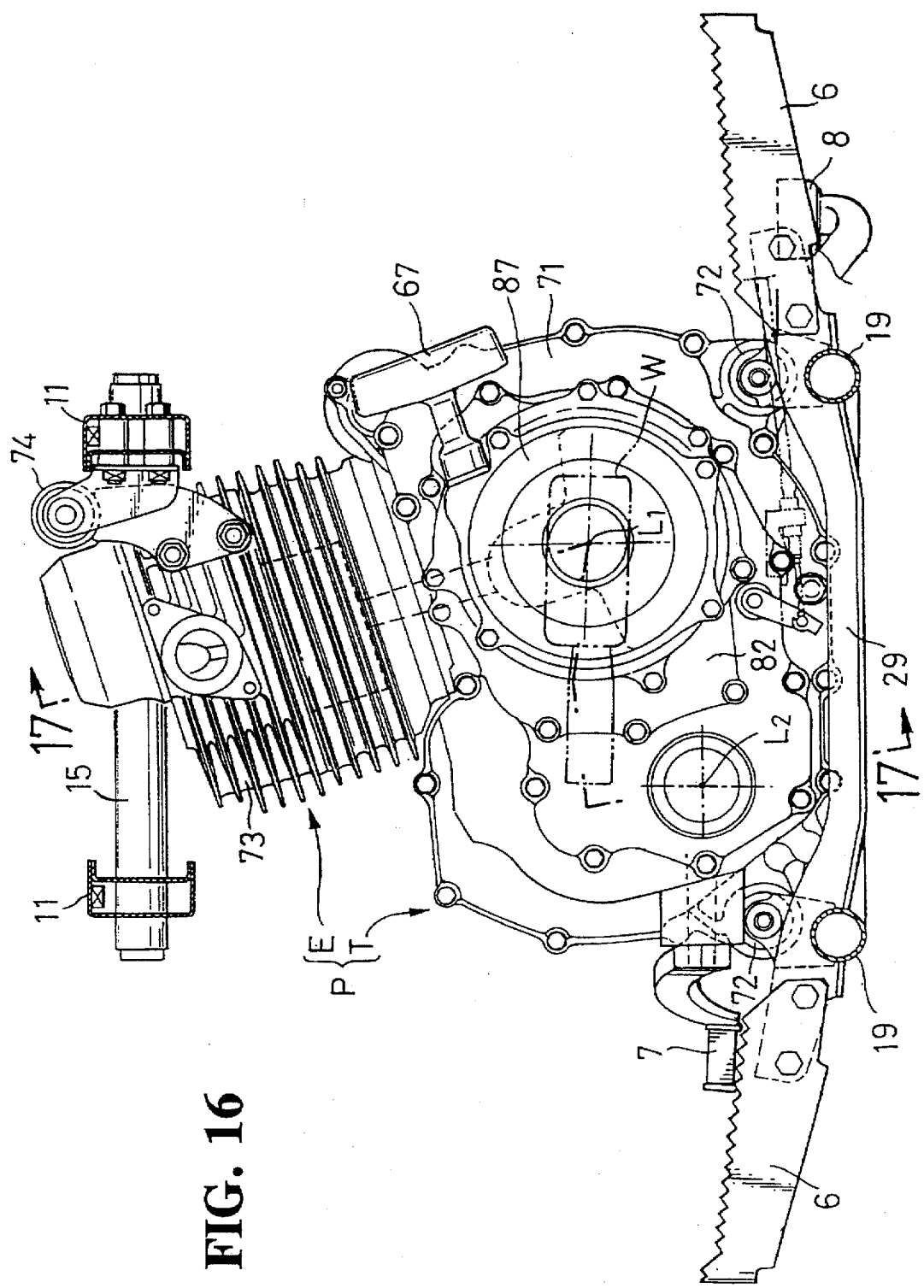
FIG. 16 is a view seen along line 16—16 of FIG. 13.
Figure 17:
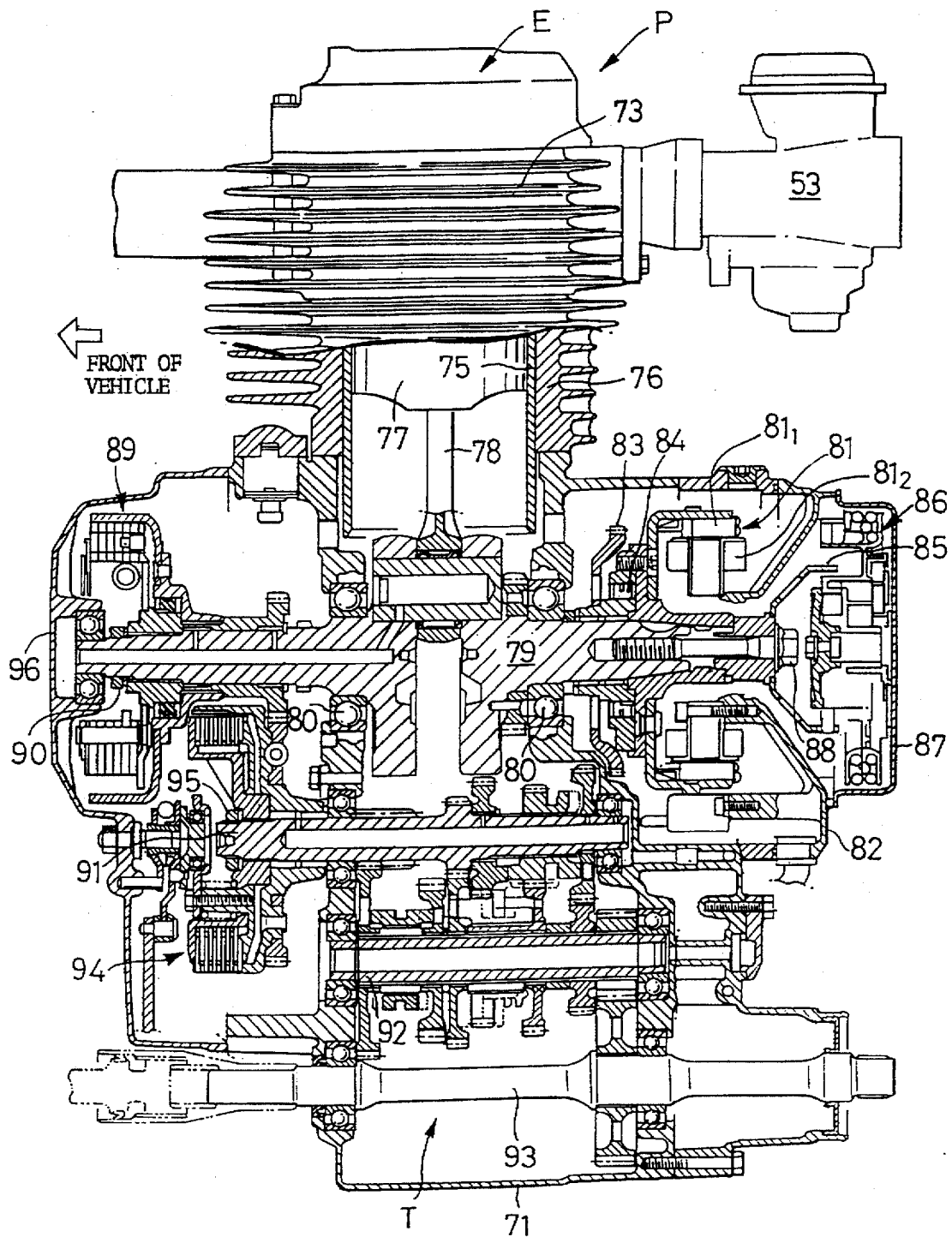
FIG. 17 is a sectional view taken along line 17—17 of FIG. 16.

The mounting and maintenance of accessories will be described below with reference to FIGS. 13 to 17. FIG. 13 is an enlarged plan view showing the central portion of the vehicular body. FIG. 14 is a view seen along line 14—14 of FIG. 13. FIG. 15 is a sectional view taken along line 15—15 of FIG. 13. FIG. 16 is a view seen along line 16—16 of FIG. 13. FIG. 17 is a sectional view taken along line 17—17 of FIG. 16.

Between the right and left side members 11, 11, an oil cooler 51, a fan unit 52, the power unit P, a carburetor 53, an air cleaner 54 and a glove compartment 55 are disposed in this order from the front portion to the rear portion (see FIGS. 1 and 13).

FIG. 15 shows a portion for mounting the oil cooler 51 onto the left side member 11. As is apparent from FIG. 15 and FIG. 8, a pin hole $12_1$ and a bolt hole $12_2$ are vertically adjacently formed on the outer surface of the outer channel member 12 of the side member 11. A weld nut 56 is provided on the inner surface of the channel member 12 at a position corresponding to the bolt hole $12_2$. An L-shaped mounting bracket 57 having a pin $57_1$ and a bolt hole $57_2$ is fixed on the side member 11 by a method of fitting the pin $57_1$ into the pin hole $12_1$, arranging the bolt hole $57_2$ to face to the bolt hole $12_2$, and screwing a bolt 58 in the weld nut 56 through the bolt hole $57_2$ and the bolt hole $12_2$.

A rubber bushing 60 is fitted in a flange 59 horizontally extending from the upper surface of the oil cooler 51. A collar 61 passing through the center of the rubber bushing 60 is fixed on the mounting bracket 57 by means of a bolt 62 and a weld nut 63. A portion for mounting the oil cooler 51 to the right side member 11 has the same structure as described above. The oil cooler 51 is thus elastically supported by the right and left side members 11, 11.

Similarly, the fan unit 52 is fixed between the side members 11, 11 using weld nuts provided on the inner surfaces of the side members 11, 11. By supporting each accessory between the side members 11, 11 using weld nuts provided on the inner surfaces of the side members 11, 11 as described above, the number of parts and the number of processes can be reduced resulting in the lowered cost as compared with the case where special brackets are welded on the side members 11 and each accessory is supported by the mounting brackets.

As is apparent from FIG. 9, clip holes $12_3$, $12_3$ are provided on the upper surfaces of the outer channel members 12, 12 of the right and left side members 11, 11. Resin clips 66, 66 passing through mounting brackets 65, 65 projecting from the air cleaner 54 in the right and left are elastically engaged with the clip holes $12_3$, $12_3$, so that the air cleaner 54 is supported by the right and left side members 11, 11. Like the air cleaner 54, the glove compartment 55, shown in FIG. 1, is supported by the right and left side members 11, 11 by way of resin clips.

In FIG. 13, a knob 67 for a recoil starter and an air intake pipe 68 connected to an inlet of the air cleaner 54 are illustrated.

As is apparent from FIGS. 14 and 16, the power unit P includes an engine E and a transmission T integrated with the engine E. Specifically, the crank case of the engine E and the transmission case of the transmission T are integrated as a common casing 71. The lower ends of the casing 71 are supported by the right and left lower pipes 19, 19 by way of a pair of elastic mounting members 72, 72, and a cylinder head 73 is supported by the right side member 11 by way of an elastic mounting member 74.

As is apparent from FIG. 17, the engine E includes a cylinder block 76 having a cylinder 75, the above-described cylinder head 73 connected to the upper end surface of the cylinder block 76, a piston 77 slidably fitted in the cylinder 75, and a crank shaft 79 connected to the piston 77 by way of a connecting rod 78. The crank shaft 79 is disposed in the longitudinal direction of the vehicular body and is supported in the casing 71 by means of a pair of ball bearings 80, 80.

A rotor $81_1$ of a power generator 81 is fixed at the rear end portion of the crank shaft 79. A stator $81_2$ of the rotor $81_1$ is fixed on a first rear cover 82 for covering the rear opening of the casing 71. A large diameter starting gear 83 is rotatably supported on the crank shaft 79 at a position adjacent to the axial inner end of the rotor $81_1$, and it is connected to the rotor $81_1$ by way of a one-way clutch 84. Accordingly, by driving the starting gear 83 by means of a starter motor (not shown), the crank shaft 79 is cranked to start the engine E. A starting wheel 85 is fixed at the rearmost end of the crank shaft 79. A recoil starter 86, which is engageable with the starting wheel 85 by means of a claw, is mounted on the inner surface of a second rear cover 87 connected to the rear portion of the first rear cover 82. The crank shaft 79 can be thus cranked even by pulling the knob 67 of the recoil starter 86. In addition, the knob 67 is disposed directly under the seat 3 in such a manner as to be directed upwardly and obliquely. Accordingly, it can be easily operated even in the state where a driver sits on the seat 3 or stands on the side of the vehicular body.

With this arrangement, by removal of the second rear cover 87, the recoil starter 86 integrated therewith can be removed. The starting wheel 85 can be also pulled-out rearwardly by removing a bolt 88 provided on the rear end of the crank shaft 79. Moreover, the rotor $81_1$ of the power generator 81 can be pulled-out rearwardly by removing the first rear cover 82 together with the stator $81_2$ of the power generator 81.

A centrifugal starting clutch 89 is additionally provided at the front end of the crank shaft 79. Specifically, it is fixed on the crank shaft 79 by means of a nut 90.

The transmission T includes a main shaft 91, a counter shaft 92 and an output shaft 93 which are disposed in parallel to the crank shaft 79. A plurality of gear trains for selectively establishing a plurality of gear-shifting steps are provided between the main shaft 91 and the counter shaft 92. A multiple disk type gear-shifting clutch 94 is additionally provided at the front end of the main shaft 91. The gear-shifting clutch 94 is fixed on the main shaft 91 by means of a nut 95.

The nut 90 can be thus removed from the crank shaft 79 by removing a front cover 96 for covering the front opening of the casing 71, to thereby forwardly pull-out the starting clutch 89. Moreover, the gear-shifting clutch 94 can be forwardly pulled-out by removing the nut 95 from the main shaft 91.

As is apparent from FIGS. 14 and 17, the front end of the output shaft 93 is connected to the front wheels Wf, Wf by a front drive shaft 97, and the rear end of the output shaft 93 is connected to the rear wheels Wr, Wr by a rear drive shaft 98. An axial line $L_1$ of the crank shaft 79 is located at a position higher than an axial line $L_2$ of the output shaft 93, and is deviated rightwardly of the vehicular body. The lower end of the fan unit 52 and the lower end of the air cleaner 54 are located at positions higher than the axial line $L_1$ of the crank shaft 79. Thus, a front operating space Sf for inserting an impact wrench W is formed in front of the crank shaft 79, that is, in front of the front cover 96, while a rear operating space Sr for inserting an impact wrench W is formed in back of the first and second rear covers 82, 87 (see FIG. 14).

During their maintenance, the recoil starter 86 and the power generator 81 can be removed by inserting the impact wrench W in the rear operating space Sr while leaving the power unit P mounted in the vehicular body, and removing the first and second rear covers 82, 87 and the nut 88 (See FIG. 17).

Similarly, as also shown in FIG. 17, during maintenance of the starting clutch 89, the starting clutch 89 and the gear-shifting clutch 94 can be removed from the power unit P by inserting the impact wrench W in the front operating space Sf while leaving the power unit P mounted in the vehicular body, and removing the front cover 96 and the nuts 90 and 95.

In this way, the power unit P is not required to be removed for each maintenance of the accessories, to thereby significantly improve the workability.

Although the present invention has been described with reference to the specific embodiment, it will be understood that the present invention is not limited thereto, and that various modifications are possible without departing from the spirit and scope of the present invention.

For example, the accessories removably provided at the end of the crank shaft 79 are not limited to the power generator 81, the recoil starter 86, and the starting clutch 89. As for the front and rear operating spaces Sf, Sr, at least either of them is required to be provided for obtaining the sufficient effect. Moreover, in the embodiment, the axial line $L_1$ is located at the position higher than that of the axial line $L_2$ of the output shaft 93, and it is deviated rightwardly of the vehicular body. However, the position of the axial line $L_2$ is not limited thereto, and may be set at a free position (for example, at the position equal to that of the crank shaft 79) so long as the front and rear operating spaces Sf, Sr can be ensured.

As described above, according to the present invention, accessories such as a power generator, a recoil starter and a clutch removably provided at the end portion of a crank shaft of a power unit are covered with removable covers, and operating spaces are formed in front of and in back of the covers, so that the covers and the accessories can be mounted/dismounted by inserting a tool such as a wrench in the spaces while leaving the power unit mounted to the vehicular body, thus allowing easy access to and maintenance of the accessories in a short period of time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
    a power unit having a crank shaft disposed in a longitudinal direction of a vehicular body of the vehicle;
    a pair of front wheels and a pair of rear wheels respectively provided on front and rear portions of said vehicular body; p1 means for mounting said crank shaft between said pair of front wheels and said pair of rear wheels;
    an accessory removably provided at an end portion of said crank shaft; and
    a removable cover covering said accessory; whereby an operational space is provided within said vehicular body at least either one of in front of and in back of said removable cover; said operational space being large enough to receive a tool for engaging said accessory without moving the power unit.

2. The vehicle according to claim 1, wherein said accessory is one of a power generator, a recoil starter, and a clutch.

3. The vehicle according to claim 1, wherein said operational space is large enough to receive said tool while said power unit is still in position in the vehicle.

4. The vehicle according to claim 1, further comprising:
    an output shaft parallel to said crank shaft;
    a front drive shaft connecting said output shaft to said pair of front wheels; and
    a rear drive shaft connecting said output shaft to said pair of rear wheels,
    wherein an axial line of said crank shaft is higher than an axial line of said front drive shaft and of said rear drive shaft.

5. The vehicle according to claim 1, further comprising:
    a fan unit; and
    an air cleaner,
    wherein a lower end of said fan unit and a lower end of said air cleaner are higher than an axial line of said crank shaft.

6. The vehicle according to claim 1, further comprising:

right and left side members of said vehicular body; and right and left mounting brackets fixed on a corresponding one of said right and left side members, wherein said accessory further comprises right and left flanges horizontally extending from an upper surface of said accessory, said accessory being removably provided by, for each flange, a rubber bushing fitted in the flange, a collar passing through the center of said rubber bushing, a bolt passing through said collar, and a nut fixing said bolt on the corresponding mounting bracket.

7. The vehicle according to claim 1, further comprising:

right and left side members of said vehicle body;

clip holes provided on an upper surface of said side members;

mounting brackets projecting from said accessory; and resin clips passing through said mounting brackets and elastically engaging with said clip holes.

8. The vehicle according to claim 1, wherein said removable cover comprises at least one of a front cover removable within said operational space in front of said removable cover and a rear cover removable within said operational space in the back of said removable cover.

9. The vehicle according to claim 8, wherein said accessory is one of a power generator and a recoil starter, and said accessory is removable from the vehicle after said rear cover has been removed.

10. The vehicle according to claim 8, wherein said accessory is one of a starting clutch and a gear-shifting clutch, and said accessory is removable from the vehicle after said front cover has been removed.

11. A method of maintaining accessories in a vehicle while a power unit remains in position in the vehicle comprising the steps of:

removably providing the accessory at an end portion of a crank shaft in the vehicle;

covering the accessory with a removable cover;

forming an operational space within a vehicular body of the vehicle in at least either one of in front of and in back of said removable cover; and inserting a tool for engaging with the accessory in said operational space wherein said operational space is large enough to receive said tool without removing the power unit.

12. The method according to claim 11, further comprising, prior to said inserting step, mounting the power unit containing said crank shaft between front wheels and rear wheels of the vehicle.

13. The method according to claim 11, further comprising providing an output shaft parallel to said crank shaft and mounting said crank shaft such that an axial line of said crank shaft is higher than an axial line of a front drive shaft connecting said output shaft to said front wheels and an axial line of a rear drive shaft connecting said output shaft to said rear wheels.

14. The method according to claim 11, further comprising mounting a fan unit and an air cleaner such that a lower end of said fan unit and a lower end of said air cleaner are higher than an axial line of said crank shaft.

15. The method according to claim 11, further comprising bolting right and left flanges extending from the accessory to mounting brackets on corresponding right and left side members of the vehicular body of the vehicle.

16. The method according to claim 11, further comprising providing clip holes on upper surfaces of right and left side members of the vehicular body of the vehicle, and passing resin clips through mounting brackets projecting from the accessory and through said clip holes.

17. The method according to claim 11, wherein said inserting step comprises inserting said tool in said space in front of said removable cover and removing a front portion of said removable cover to access the accessory.

18. The method according to claim 11, wherein said inserting step comprises inserting said tool in said space behind said removable cover and removing a rear portion of said removable cover.

19. The method according to claim 12, further comprising removing the accessory to be maintained using said tool.

20. The method according to claim 19, further comprising performing maintenance on said removed accessory and replacing the accessory in the vehicle, while said power unit remains mounted in the vehicle.

21. A vehicle comprising:

a power unit having a crank shaft disposed in a longitudinal direction of a vehicular body of the vehicle;

a pair of front wheels and pair of rear wheels respectively provided on front and rear portions of said vehicular body; and means for mounting said power unit between said pair of front wheels and said pair of rear wheels, said power unit including an accessory removably provided at an end portion of said crank shaft and a removable cover covering said accessory, whereby an operational space is provided within the vehicular body adjacent said removable cover; said operational space being large enough to receive a tool for engaging said accessory without moving the power unit.

22. The vehicle according to claim 21, wherein said accessory is one of a power generator, a recoil starter, and a clutch.

23. The vehicle according to claim 21, wherein the operational space is large enough to receive a tool while said power unit is still in position in the vehicle.

24. The vehicle according to claim 21, further comprising:

an output shaft parallel to said crank shaft;

a front drive shaft connecting said output shaft to said pair of front wheels; and a rear drive shaft connecting said output shaft to said pair of rear wheels, wherein an axial line of said crank shaft is higher than an axial line of said front drive shaft and of said rear drive shaft.

25. The vehicle according to claim 21, further comprising:

a fan unit; and an air cleaner, wherein a lower end of said fan unit and a lower end of said air cleaner are higher than an axial line of said crank shaft.

26. The vehicle according to claim 21, further comprising:

right and left side members of said vehicular body; and right and left mounting brackets fixed on a corresponding one of said right and left side members, wherein said accessory further comprises right and left flanges horizontally extending from an upper surface of said accessory, said accessory being removably provided by, for each flange, a rubber bushing fitted in the corresponding flange, a collar passing through the center of said rubber bushing, a bolt passing through said collar, and a nut fixing said bolt on the corresponding mounting bracket.

27. The vehicle according to claim 21, further comprising:

right and a left side members of said vehicle body;

clip holes provided on an upper surface of said side members;

mounting brackets projecting from said accessory; and resin clips passing through said mounting brackets and elastically engaging with said clip holes.

* * * * *